(12) United States Patent
Huber et al.

(10) Patent No.: US 7,644,966 B2
(45) Date of Patent: Jan. 12, 2010

(54) VEHICLE BUMPER FASCIA RETAINER

(75) Inventors: Matthew Huber, Novi, MI (US); Ryuu Sano, Kanagawa (JP)

(73) Assignee: Nissan Technical Center North America, Inc., Farmington Hills, MI (US)

( * ) Notice: Subject to any disclaimer, the term of this patent is extended or adjusted under 35 U.S.C. 154(b) by 9 days.

(21) Appl. No.: 12/040,522

(22) Filed: Feb. 29, 2008

(65) Prior Publication Data

US 2009/0218834 A1 Sep. 3, 2009

(51) Int. Cl.
*B60J 5/06* (2006.01)
(52) U.S. Cl. .................... 293/155; 296/193.09
(58) Field of Classification Search .......... 296/187.09, 296/193.09, 203.02; 293/155, 120, 121, 293/132, 133, 117, 154
See application file for complete search history.

(56) References Cited

U.S. PATENT DOCUMENTS

| | | | | |
|---|---|---|---|---|
| 4,707,020 | A | | 11/1987 | Enokida et al. |
| 5,303,973 | A | * | 4/1994 | Fujii ..................... 296/203.02 |
| 5,544,714 | A | * | 8/1996 | May et al. ................. 180/68.4 |
| 5,573,299 | A | * | 11/1996 | Masuda ................. 296/193.09 |
| 5,580,122 | A | * | 12/1996 | Muehlhausen ......... 296/193.02 |
| 5,988,714 | A | | 11/1999 | Akazawa et al. |
| 6,189,958 | B1 | * | 2/2001 | Guyomard et al. ..... 296/193.09 |
| 6,196,624 | B1 | * | 3/2001 | Bierjon et al. ......... 296/193.09 |
| 6,216,810 | B1 | * | 4/2001 | Nakai et al. ................ 180/68.4 |
| 6,231,093 | B1 | * | 5/2001 | Storer ........................ 293/115 |
| 6,273,496 | B1 | * | 8/2001 | Guyomard et al. ..... 296/193.09 |
| 6,282,769 | B1 | * | 9/2001 | Longo et al. ................. 29/417 |
| 6,290,287 | B1 | * | 9/2001 | Guyomard ............. 296/193.09 |
| 6,357,821 | B1 | * | 3/2002 | Maj et al. .............. 296/193.09 |
| 6,386,624 | B1 | * | 5/2002 | Schultz et al. ............ 296/193.1 |
| 6,412,855 | B1 | * | 7/2002 | Cantineau et al. ....... 296/187.01 |
| 6,450,276 | B1 | * | 9/2002 | Latcau ....................... 180/68.4 |
| 6,523,886 | B2 | * | 2/2003 | Hoffner et al. ......... 296/203.02 |
| 6,547,317 | B1 | * | 4/2003 | Cheron et al. .......... 296/193.01 |
| 6,679,545 | B1 | * | 1/2004 | Balzer et al. ........... 296/193.09 |
| 6,685,258 | B2 | * | 2/2004 | Brogly et al. .......... 296/203.02 |
| 6,708,790 | B2 | * | 3/2004 | Ozawa et al. .............. 180/68.4 |
| 6,729,008 | B2 | * | 5/2004 | Nishijima ..................... 29/458 |
| 6,729,424 | B2 | * | 5/2004 | Joutaki et al. .............. 180/68.4 |
| 6,869,131 | B2 | * | 3/2005 | Kafuku et al. .......... 296/187.09 |
| 6,877,797 | B2 | * | 4/2005 | Henderson et al. ...... 296/203.02 |
| 6,883,589 | B2 | * | 4/2005 | Ozawa et al. ................. 165/41 |
| 6,895,647 | B2 | * | 5/2005 | Matsumoto et al. ........ 29/281.4 |
| 6,923,495 | B2 | * | 8/2005 | Kishikawa et al. ...... 296/193.09 |
| 6,955,393 | B2 | * | 10/2005 | Staargaard et al. ....... 296/193.1 |
| 6,973,984 | B2 | * | 12/2005 | Cheron et al. .............. 180/68.1 |
| 6,979,053 | B2 | * | 12/2005 | Kim ...................... 296/193.09 |
| 6,997,490 | B2 | * | 2/2006 | Evans et al. ................. 293/120 |
| 7,008,008 | B2 | * | 3/2006 | Andre et al. ........... 296/203.02 |
| 7,014,257 | B2 | * | 3/2006 | Lazzeroni et al. ....... 296/203.02 |
| 7,097,239 | B2 | * | 8/2006 | Lazzeroni .............. 296/203.01 |
| 7,273,246 | B2 | | 9/2007 | Wada |

(Continued)

*Primary Examiner*—Kiran B. Patel
(74) *Attorney, Agent, or Firm*—Global IP Counsors, LLP

(57) ABSTRACT

A vehicle bumper fascia retainer is provided with a laterally extending fascia support portion, first and second front end attachment structures and first and second lamp attachment structures. The first and second front end attachment structures are disposed on opposite lateral ends of the fascia support portion for attachment to a vehicle front end. The first and second lamp attachment structures are disposed on opposite lateral ends of the fascia support portion for supporting first and second head lamp housings.

18 Claims, 15 Drawing Sheets

U.S. PATENT DOCUMENTS

| | | | |
|---|---|---|---|
| 7,278,680 B2 * | 10/2007 | Burnham | 296/193.09 |
| 7,287,613 B2 * | 10/2007 | Kim | 180/68.4 |
| 7,338,191 B2 * | 3/2008 | Konno et al. | 362/507 |
| 7,377,579 B2 * | 5/2008 | Kwon | 296/193.09 |
| 7,419,208 B2 * | 9/2008 | Sub | 296/193.09 |
| 7,497,289 B2 * | 3/2009 | Kwun et al. | 180/68.4 |
| 7,540,550 B1 * | 6/2009 | Huber et al. | 296/29 |
| 2002/0060476 A1 * | 5/2002 | Cantineau et al. | 296/194 |
| 2004/0264203 A1 * | 12/2004 | Konno et al. | 362/465 |
| 2005/0088015 A1 * | 4/2005 | Kishikawa et al. | 296/193.09 |
| 2005/0275227 A1 * | 12/2005 | Ahn | 293/155 |
| 2005/0275248 A1 * | 12/2005 | Lee | 296/193.09 |
| 2006/0255602 A1 * | 11/2006 | Evans | 293/120 |
| 2008/0179900 A1 * | 7/2008 | Hartley et al. | 293/117 |

* cited by examiner

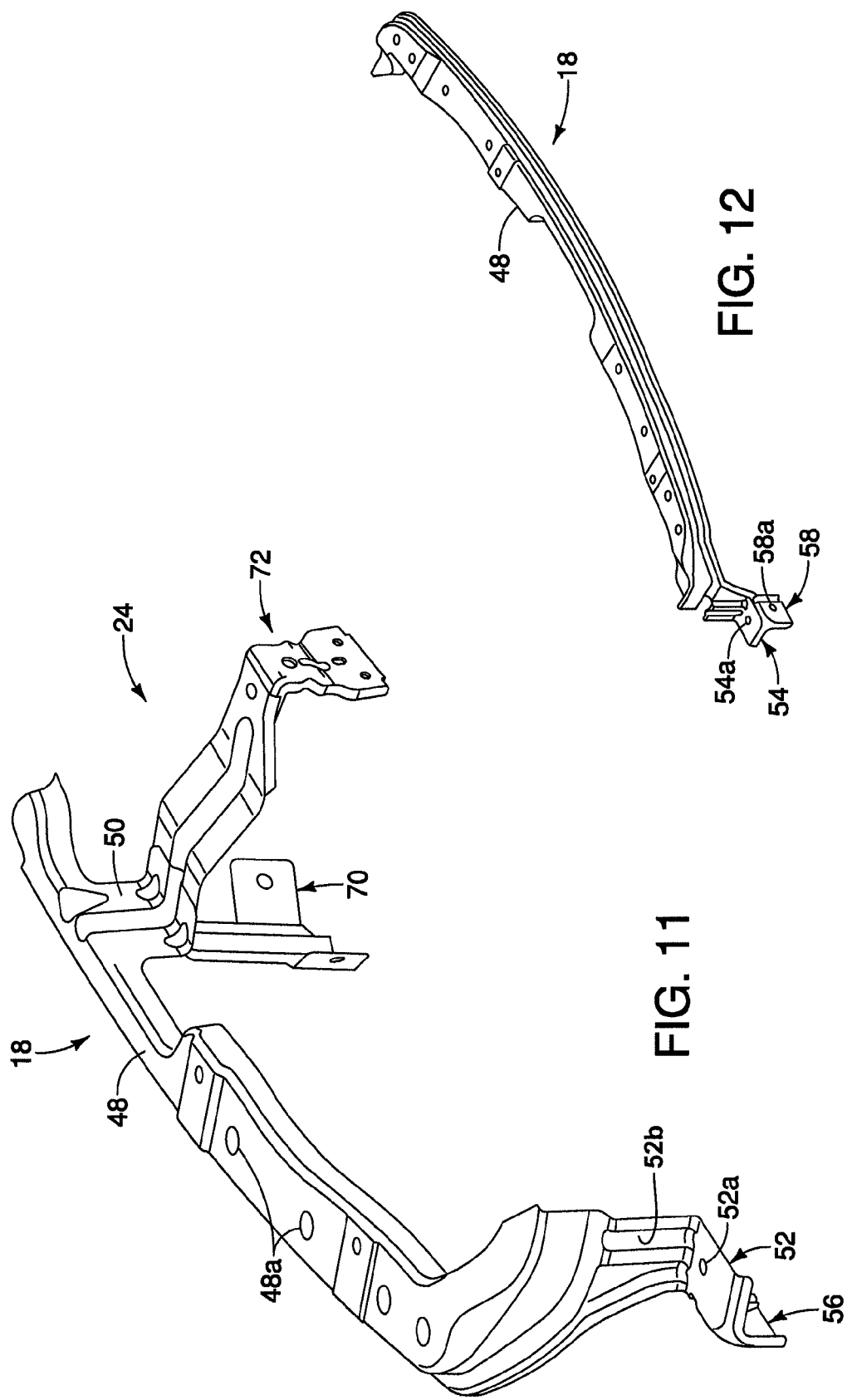

VEHICLE BUMPER FASCIA RETAINER

BACKGROUND OF THE INVENTION

1. Field of the Invention

The present invention generally relates to a vehicle bumper fascia retainer that supports the fascia of a bumper. More specifically, the present invention relates to a vehicle bumper fascia retainer supports both head lamp housings and a bumper fascia.

2. Background Information

For many years, automotive vehicles have been provided with front and rear bumpers to cushion the vehicle in the event of an impact. Also, for many years, automotive vehicles have been provided with numerous body and/or fascia panels coupled thereto to form the outer shell of the vehicle body. In recent years, it has been desirable to make vehicles with a smooth exterior shape, in which the bumpers are integrated with the overall shape of the vehicle body. Thus, in recent years, bumpers have often been provided with bumper fascia mounted to the bumpers such that the bumper fascia extends across the bumper and wraps around the corners of the bumper. Sometimes the bumper fascia for the front bumper is attached to a radiator core support. Also head lamps of vehicles are also attached to the radiator core support in an assembling production line of front end module for a motor vehicle body. Thus, the bumper fascia and the head lamps are mounted on the radiator core support of the vehicle body.

When attaching the head lamps to the radiator core support, it is necessary to fix the head lamps to the radiator core support in a precisely positioned state. Thus, a secure mounting structure is typically provided on the radiator core support. On the other hand, the bumper fascia is held to the radiator core support at its both side portions by clips provided on the core support.

In view of the above, it will be apparent to those skilled in the art from this disclosure that there exists a need for an improved vehicle bumper fascia retainer. This invention addresses this need in the art as well as other needs, which will become apparent to those skilled in the art from this disclosure.

SUMMARY OF THE INVENTION

One object of the present invention to provide a vehicle bumper fascia retainer that supports both head lamp housings and a bumper fascia.

In view of the foregoing object, a vehicle bumper fascia retainer is provided that basically comprises a laterally extending fascia support portion, a first front end attachment structure, a second front end attachment structure, a first lamp attachment structure and a second lamp attachment structure. The first front end attachment structure is disposed on a first lateral end of the fascia support portion, with the first front end attachment structure being configured to be attached to a vehicle front end at a first point. The second front end attachment structure is disposed on a second lateral end of the fascia support portion, with the second front end attachment structure being configured to be attached to the vehicle front end at a second point. The first lamp attachment structure is disposed on the first lateral end of the fascia support portion, with the first lamp attachment structure being configured to be support a first head lamp housing. The second lamp attachment structure is disposed on the second lateral end of the fascia support portion, with the second lamp attachment structure being configured to be support a second head lamp housing.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure:

FIG. 11 is a partial rear perspective view of the vehicle bumper fascia retainer with a center front end attachment structure coupled thereto;

FIG. 12 is a front perspective view of the vehicle bumper fascia retainer of the illustrated embodiment;

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
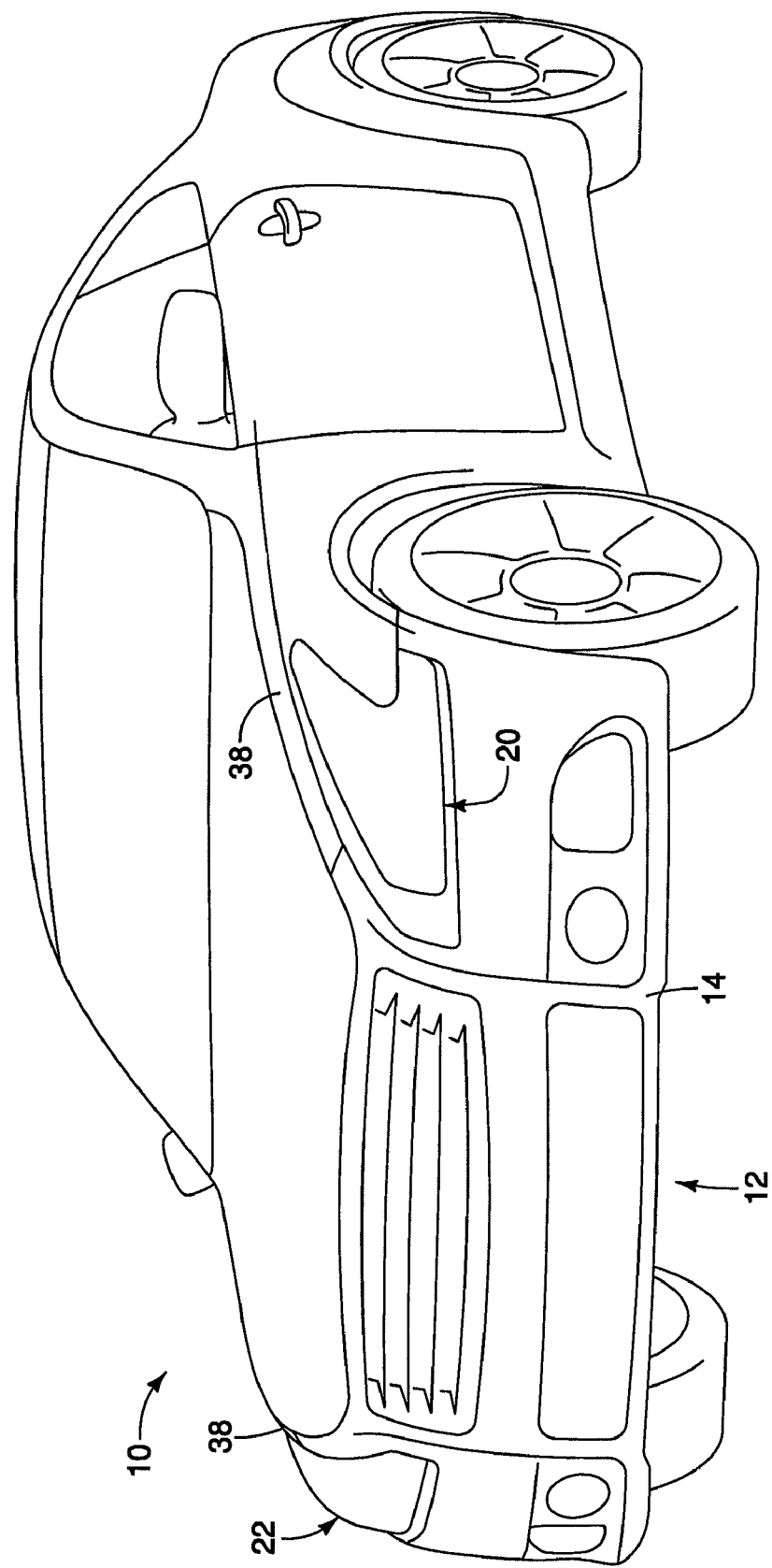
FIG. 1 is a front perspective view of a vehicle equipped with a vehicle front end assembly having a vehicle bumper fascia retainer in accordance with one embodiment.
Figure 2:
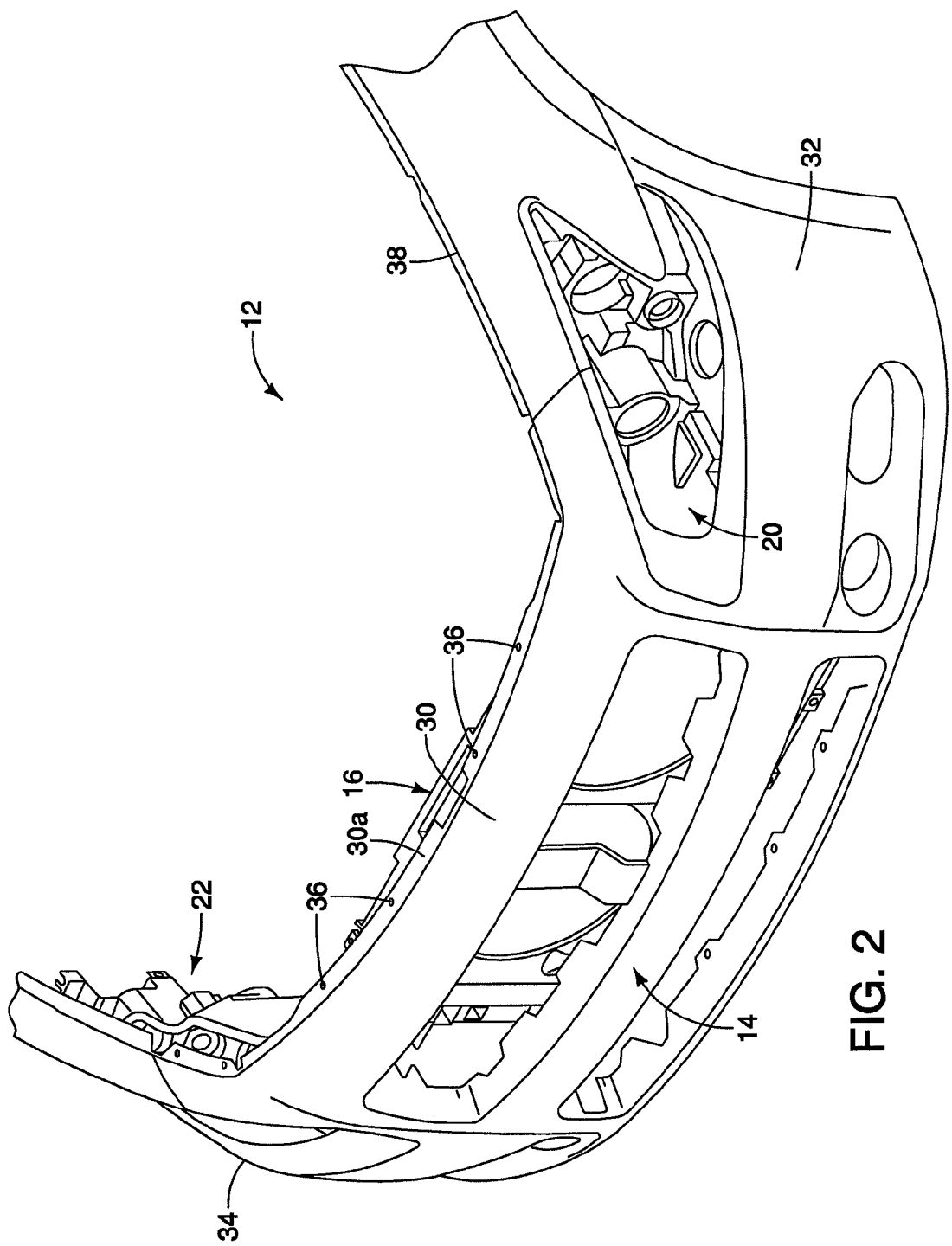
FIG. 2 is a partial front perspective view of selected parts of the vehicle front end assembly illustrated in FIG. 1 including the bumper fascia panel and one of the head lamp housings.
Figure 3:
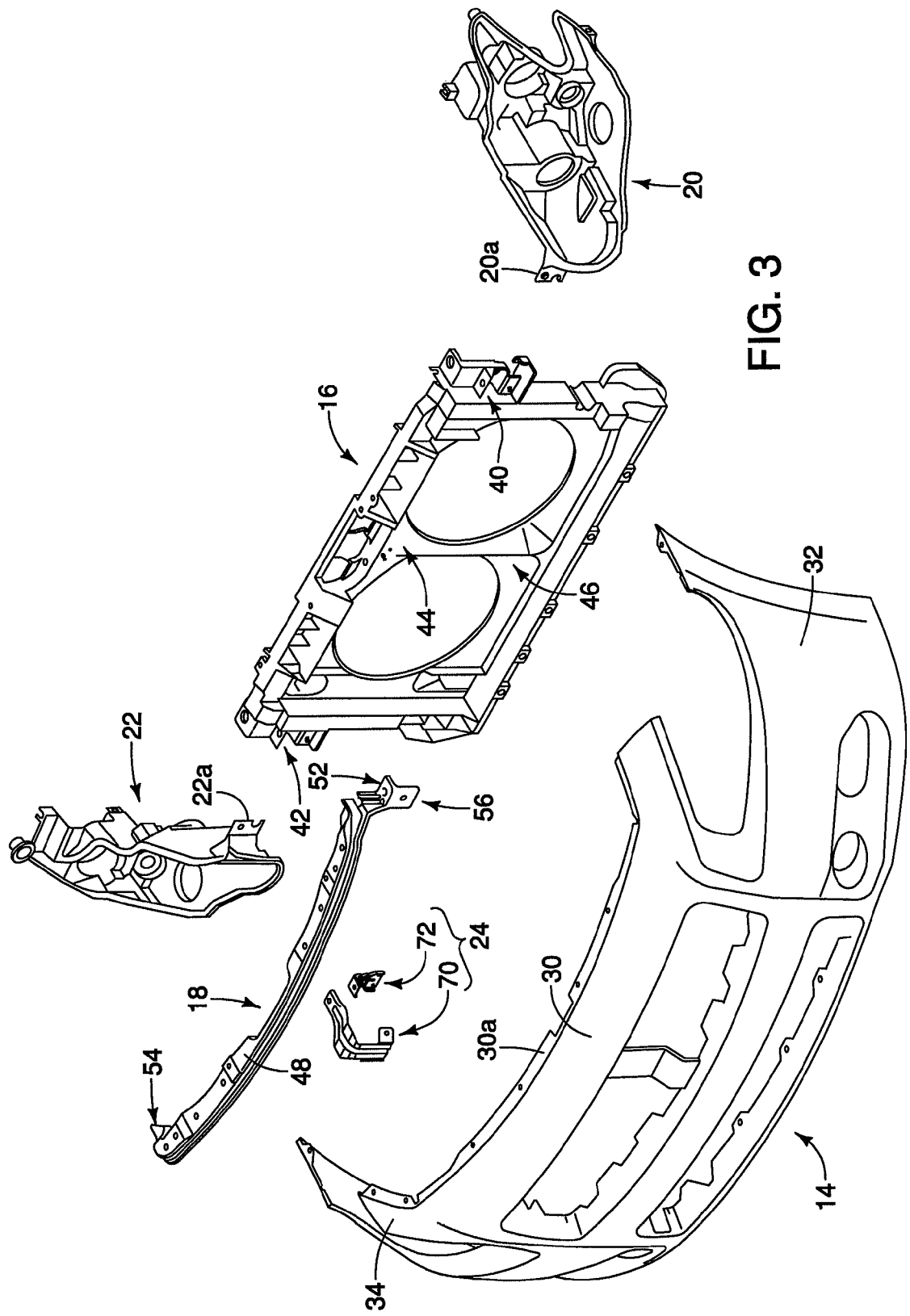
FIG. 3 is an exploded front perspective view of selected parts of the vehicle front end assembly illustrated in FIGS. 1 and 2.
Figure 4:
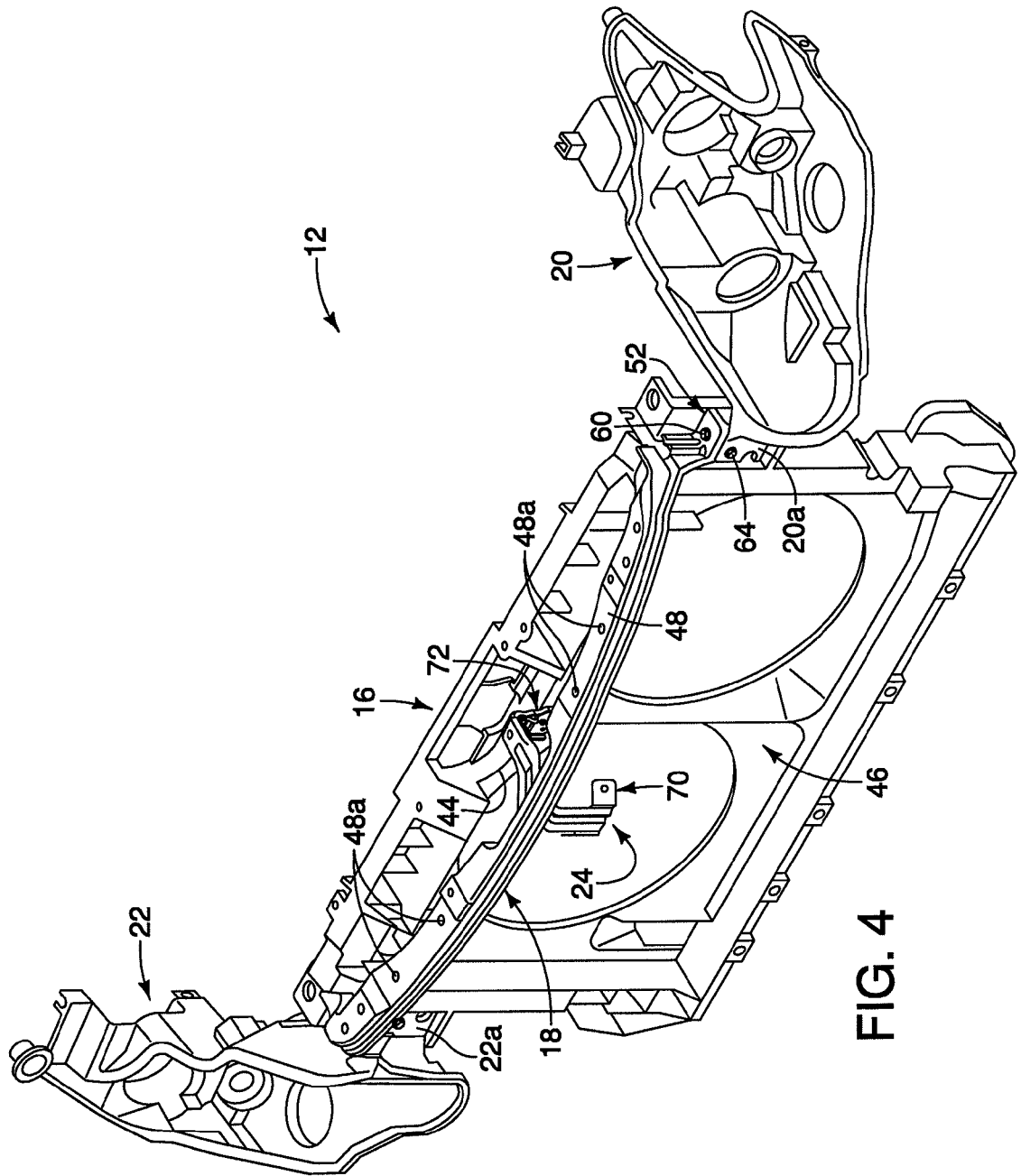
FIG. 4 is a front perspective view of the radiator core support with the vehicle bumper fascia retainer mounted thereto and the head lamp housings supported on the vehicle bumper fascia retainer.
Figure 5:
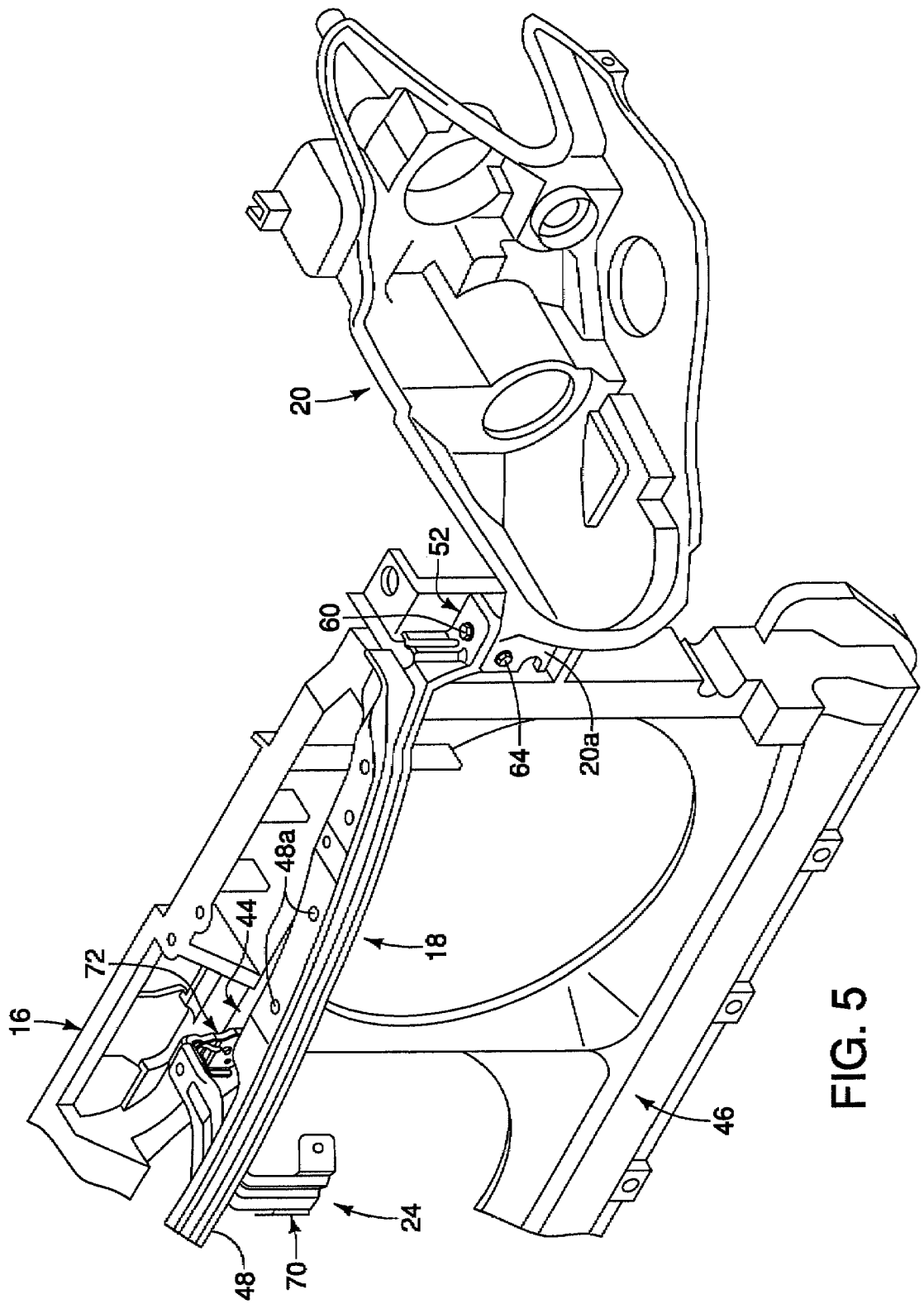
FIG. 5 is a partial front perspective view of the left half of the radiator core support with the vehicle bumper fascia retainer mounted thereto and the head lamp housings supported on the vehicle bumper fascia retainer.
Figure 8:
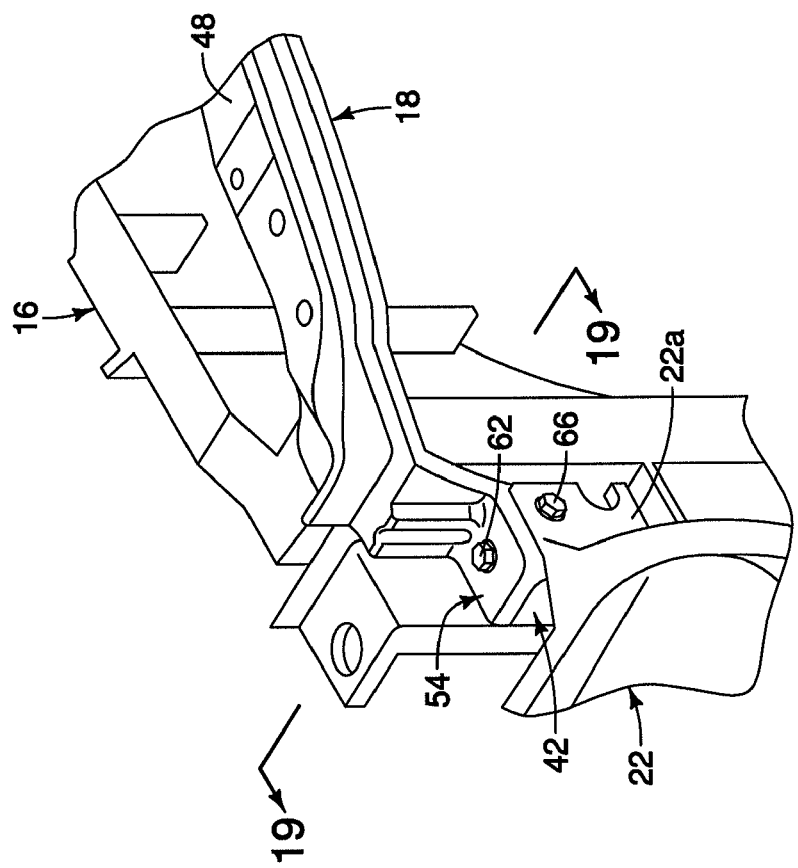
FIG. 8 is an enlarged, partial front perspective view of the right end connection between the radiator core support and the vehicle bumper fascia retainer with the right lamp housing supported on the vehicle bumper fascia retainer.
Figure 9:
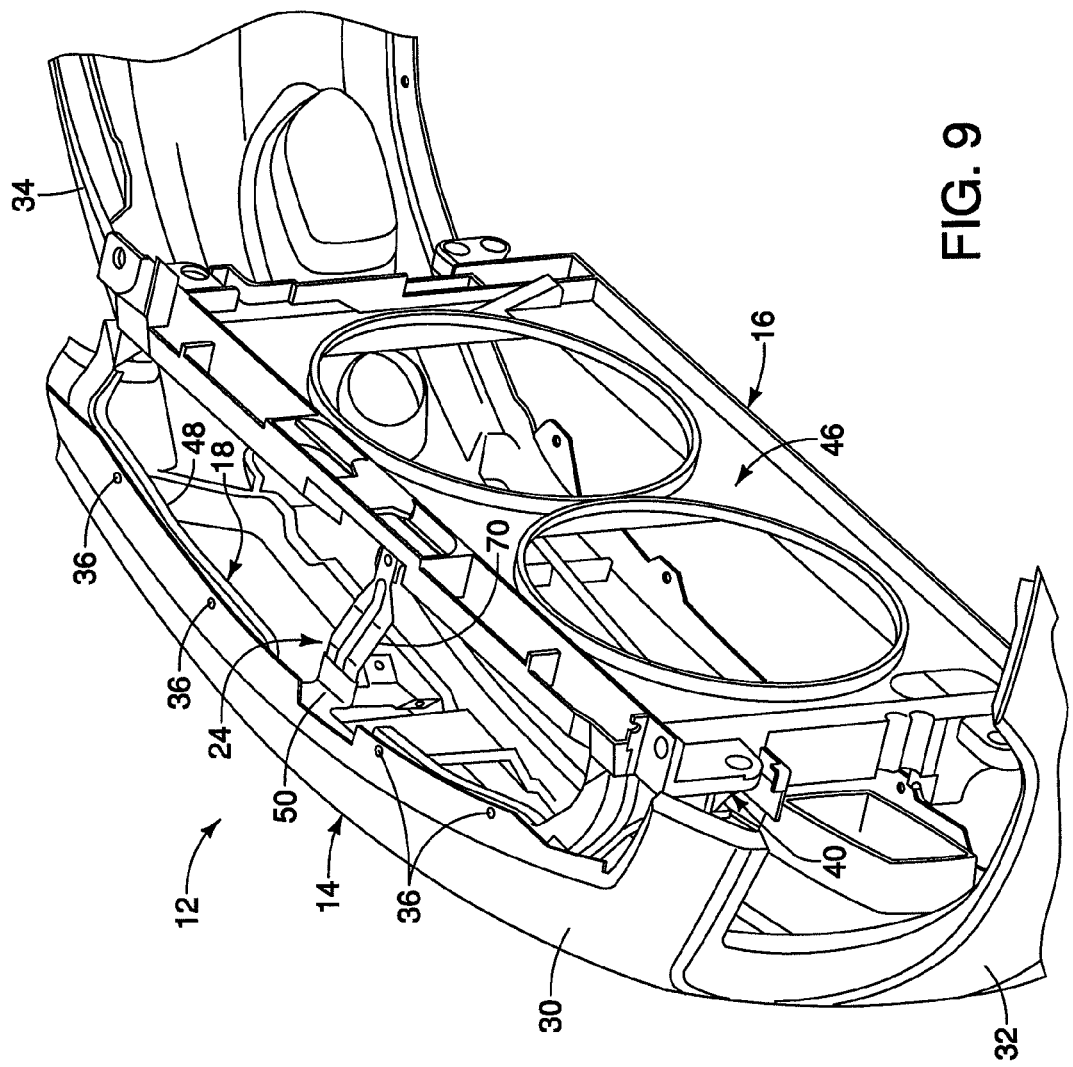
FIG. 9 is a partial rear perspective view of the bumper fascia supported on the radiator core support by the vehicle bumper fascia retainer.

Referring initially to FIGS. 1-9, an automotive vehicle 10 is illustrated with a vehicle front end assembly 12 in accordance with one embodiment. The vehicle 10 is conventional, except for the vehicle front end assembly 12 as described herein. Accordingly, the vehicle 10 and its various parts will not be discussed and/or illustrated in detail herein, except as related to the vehicle front end assembly 12. As seen in FIG. 3, the vehicle front end assembly 12 basically includes a bumper fascia panel 14, a radiator core support 16, a vehicle bumper fascia retainer 18, a first head lamp housing 20, a second head lamp housing 22 and a center attachment structure 24. As seen in FIGS. 4, 5 and 9, the radiator core support 16 constitutes a part of a vehicle front end module that supports the bumper fascia panel 14 and the first and second head lamp housings 20 and 22 via the vehicle bumper fascia retainer 18 as discussed below. Preferably, as seen in FIGS. 4 to 9, the vehicle bumper fascia retainer 18 is attached at three points to the radiator core support 16 with an upper part of the bumper fascia panel 14 supported on the vehicle bumper fascia retainer 18.

Basically, as seen in FIGS. 2 and 3, the bumper fascia panel 14 is a one-piece, unitary member formed of a thin, lightweight sheet material such as a rigid plastic material (e.g., a thermoplastic olefin elastomer) or any other suitable material. In any case, the bumper fascia panel 14 should be constructed of a self supporting material with a degree of flexibility such that the bumper fascia panel 14 is flexible yet maintains its shape. The bumper fascia panel 14 includes an elongated transverse portion 30, a first bent end portion 32 and a second bent end portion 34. The first and second bent end portions 32 and 34 are arranged at opposite ends of the transverse portion 30 such that the bumper fascia panel 14 has a wide, substantially U-shaped overall profile as viewed from above (FIG. 3). The bumper fascia panel 14 covers a rigid bumper member (not shown). The elongated transverse portion 30 of the bumper fascia panel 14 has an upper transverse mounting flange 30a that is fastened to the vehicle bumper fascia retainer 18 by a plurality of fasteners 36 such as rivets. The first and second bent end portions 32 and 34 of the bumper fascia panel 14 are also mounted to a pair of fenders 38 via a plurality of fasteners (not shown). Since the connections between the bumper fascia panel 14 and the fenders 38 is not relevant to the mounting of the bumper fascia panel 14 to the radiator core support 16, the connections between the bumper fascia panel 14 and the fenders 38 will not be discussed herein.

As seen in FIGS. 3, 4, 9 and 10, the radiator core support 16 is a one-piece, unitary member formed of a rigid plastic material. Of course, it will be apparent to those skilled in the art from this disclosure that other configurations of the radiator core support 16 are possible as needed and/or desired. Thus, the radiator core support 16 is illustrated in a simplified form for the sake of illustration. The radiator core support 16 basically includes among other things, a first lateral end with a first connection structure 40, a second lateral end with a second connection structure 42, an intermediate or center connection structure 44 and an engine cooling support arrangement 46. Since remaining structures of the radiator core support 16 are conventional, the remaining structures of the radiator core support 16 will not be discussed or illustrated in detail.

Figure 6:
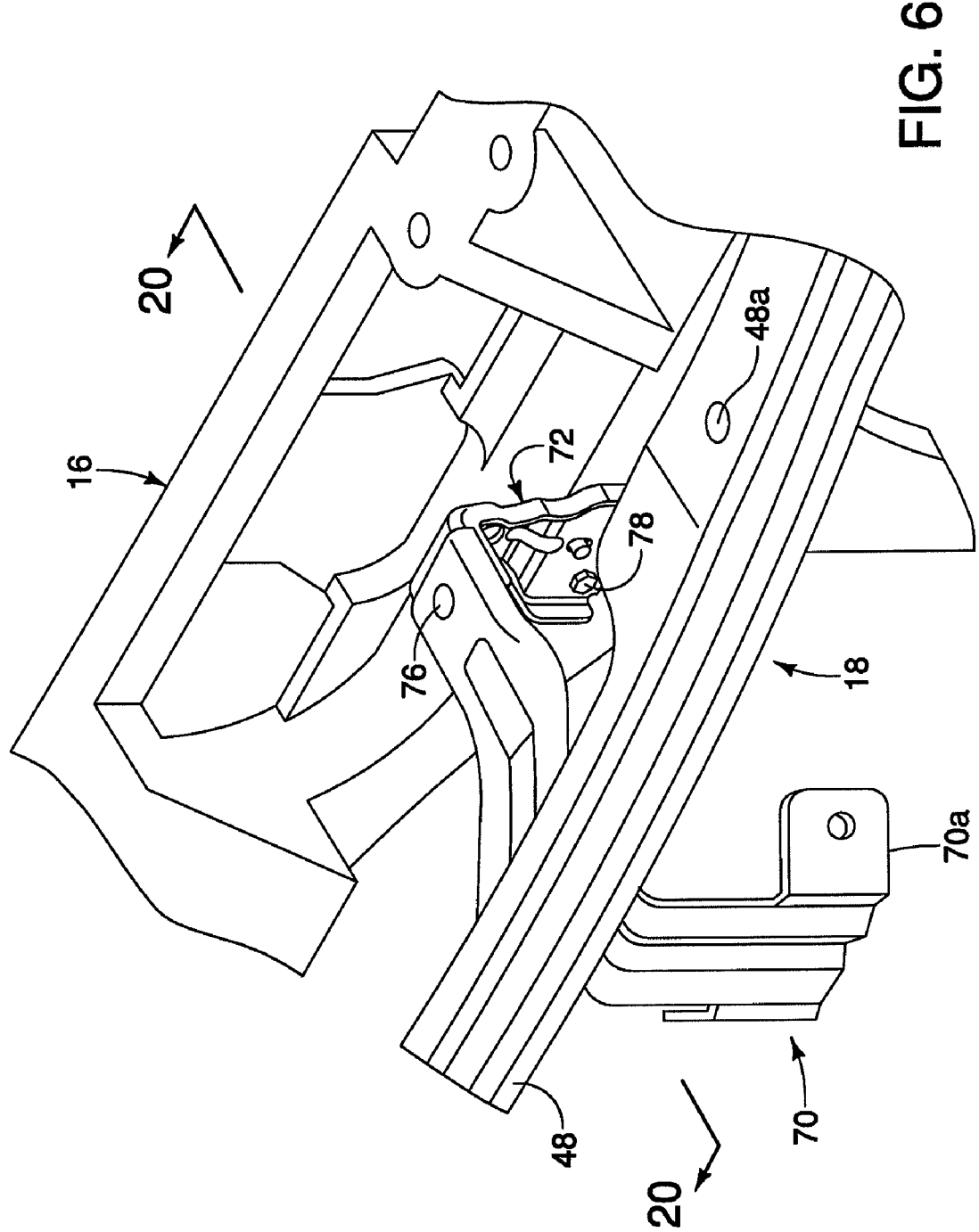
FIG. 6 is an enlarged, partial front perspective view of a center connection between the radiator core support and the vehicle bumper fascia retainer.
Figure 10:
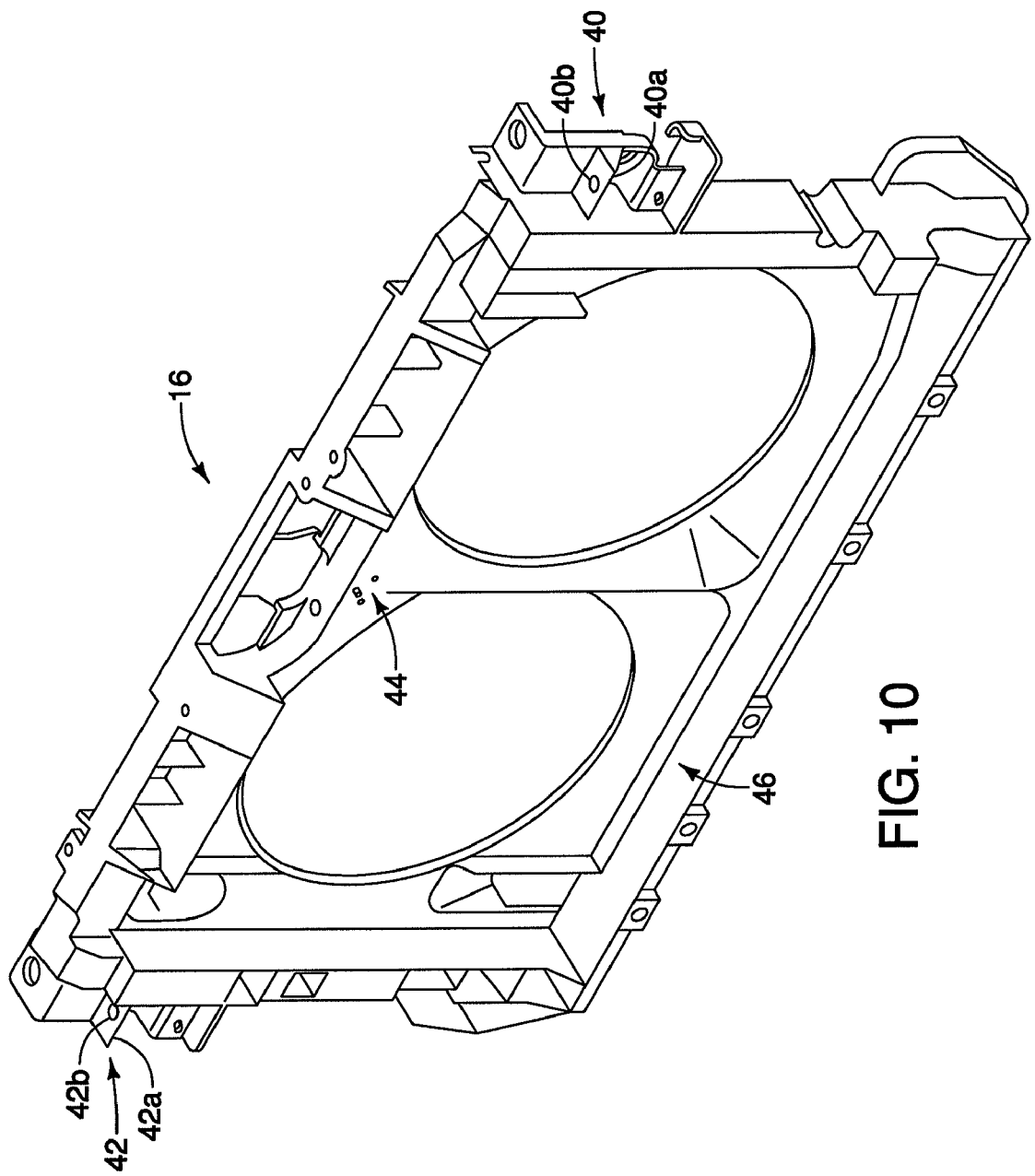
FIG. 10 is a front perspective view of the radiator core support of the illustrated embodiment.

Basically, as seen in FIGS. 3 and 10, the first connection structure 40 of the radiator core support 16 has a horizontal mounting flange 40a with a vertically extending hole 40b for securing a first lateral end of the vehicle bumper fascia retainer 18 thereto. Similarly, the second connection structure 42 of the radiator core support 16 has a horizontal mounting flange 40b with a vertically extending hole 42b for securing a second lateral end of the vehicle bumper fascia retainer 18 thereto. Preferably, the first and second connection structures 42 are mirror images of each other. As seen in FIGS. 6 and 10, the intermediate connection structure 44 includes a pair of threaded holes and a locating pin for securing an intermediate part of the vehicle bumper fascia retainer 18 thereto via the center attachment structure 24.

As seen in FIG. 10, the engine cooling support arrangement 46 of the radiator core support 16 is provided with various mounting structures for fixedly securing various cooling related components (e.g., a radiator core, cooling fans, etc.) and other vehicle components (e.g., a condenser, a windshield wiper fluid container, etc) thereto as needed and/or desired. These various mounting structures for fixedly securing various cooling related components and other vehicle components are well known. Thus, the various mounting structures for fixedly securing various cooling related components (e.g., a radiator core, cooling fans, etc.) and other vehicle components will not be discussed or illustrated herein.

As best seen in FIGS. 11-14, the vehicle bumper fascia retainer 18 is preferably a rigid metal member that is constructed by stamping a sheet metal material. Of course, it will be apparent to those skilled in the art from this disclosure that other materials or constructions can be used as needed and/or desired. The vehicle bumper fascia retainer 18 basically includes a laterally extending fascia support portion 48 with a center mounting flange 50, a first front end attachment structure 52, a second front end attachment structure 54, a first lamp attachment structure 56 and a second lamp attachment structure 58.

The fascia support portion 48 has a plurality of holes 48a in its upper surface for receiving fasteners 36 to fixedly secure the bumper fascia panel 14 thereto. Thus, the upper transverse mounting flange 30a that extends along the center portion of the bumper fascia panel 14 is supported by the fascia support portion 48. The center mounting flange 50 of the fascia support portion 48 is attached to the intermediate connection structure 44 of the radiator core support 16 by the center attachment structure 24 as seen in FIG. 6.

Figure 7:
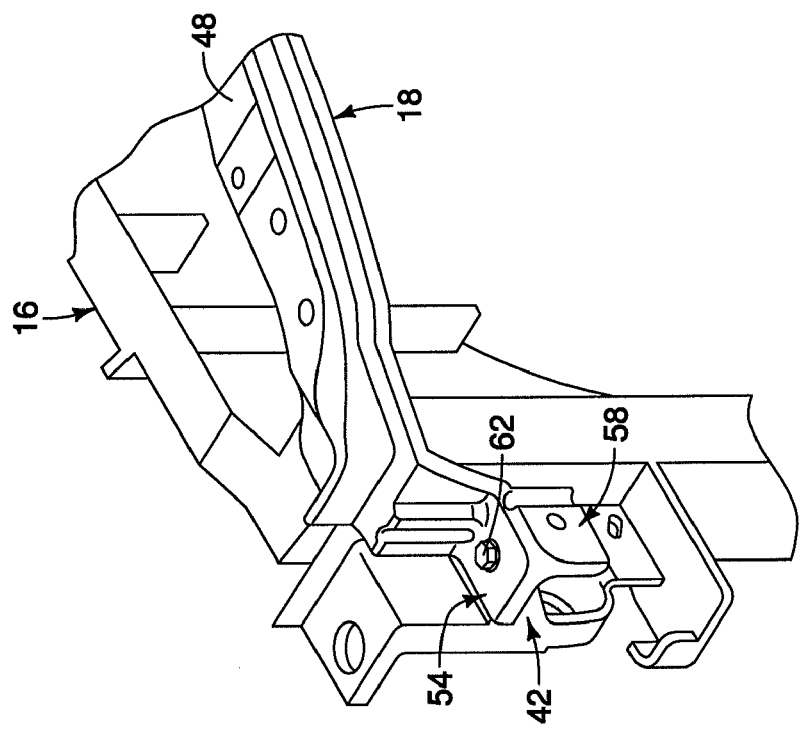
FIG. 7 is an enlarged, partial front perspective view of a right end connection between the radiator core support and the vehicle bumper fascia retainer.
Figure 19:
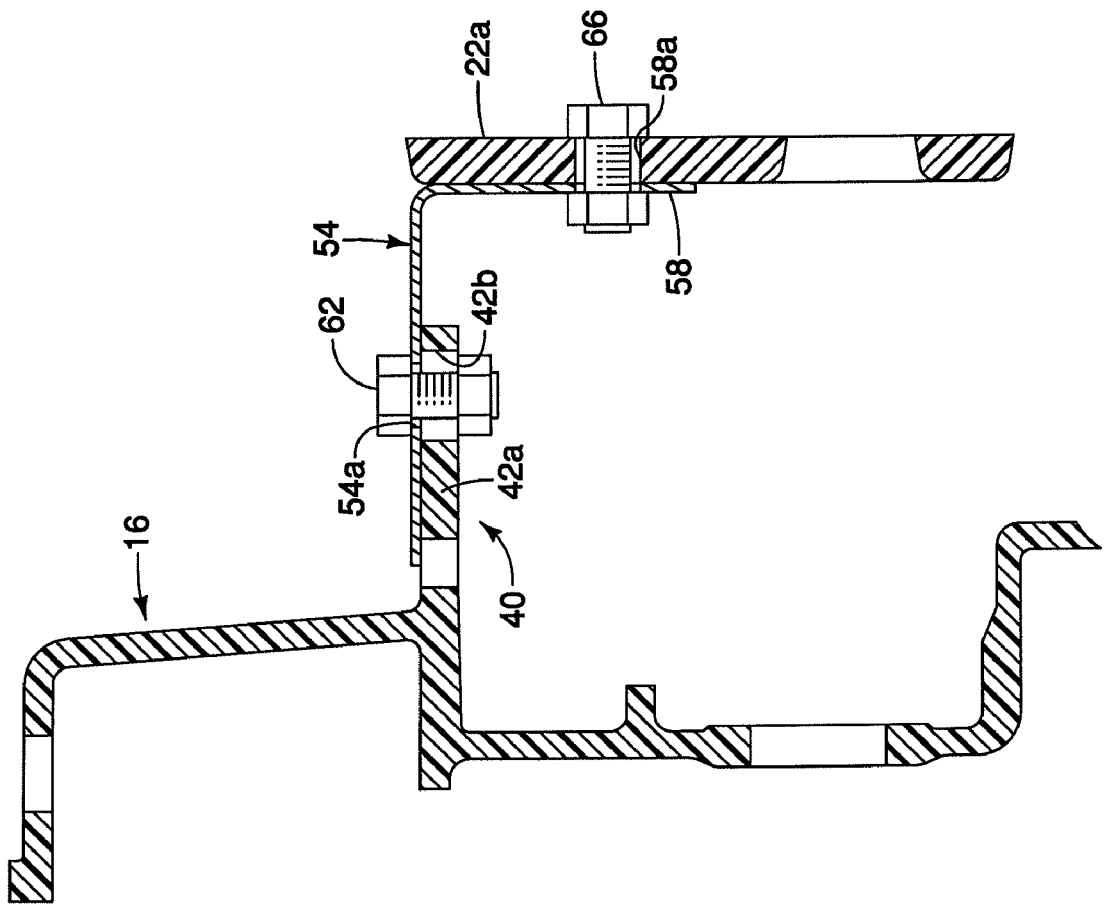
FIG. 19 is a simplified cross sectional view of the left end connection between the radiator core support and the vehicle bumper fascia retainer as seen along section line 19-19 in FIG. 8.
Figure 20:
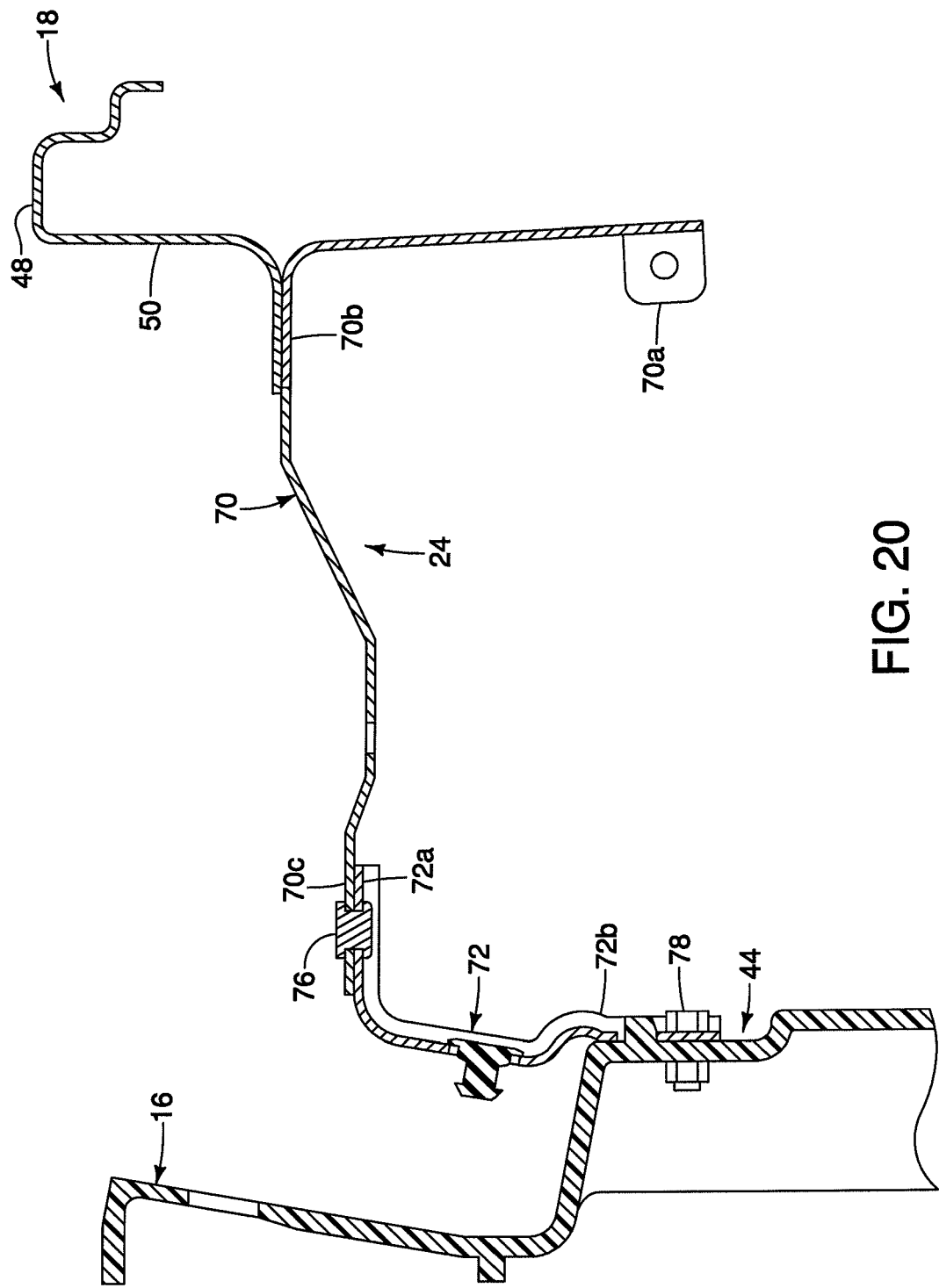
FIG. 20 is a simplified cross sectional view of the middle connection between the radiator core support and the vehicle bumper fascia retainer as seen along section line 20-20 in FIG. 6.

Generally speaking, the first front end attachment structure 52 is disposed on a first lateral end of the fascia support portion 48. The first front end attachment structure 52 is configured to be attached to the radiator core support 16 (e.g., a vehicle front end) at a first point located at the first lateral end of the radiator core support 16 by a fastener 60 such as a nut and bolt arrangement similar to the nut and bolt arrangement as shown in FIG. 19. Similarly, the second front end attachment structure 54 is disposed on a second lateral end of the fascia support portion 48. The second front end attachment structure 54 is configured to be attached to the radiator core support 16 (e.g., a vehicle front end) at a second point at the second lateral end of the radiator core support 16 by a fastener 62 (such as the nut and bolt arrangement as shown in FIGS. 7, 8 and 19.

As seen in FIG. 4, the first lamp attachment structure 56 is disposed on the first lateral end of the fascia support portion 48, while the second lamp attachment structure 58 is disposed on the second lateral end of the fascia support portion 48. The first lamp attachment structure 56 supports the first head lamp housing 20 on the first lateral end of the radiator core support 16. The second lamp attachment structure 58 supports the second head lamp housing 22 on the second lateral end of the radiator core support 16. Preferably, the first and second front end attachment structures 52 and 54 and the first and second lamp attachment structures 56 and 58 are integrally formed as a one-piece, unitary member with the fascia support portion 48. Moreover, the first front end attachment structure 52 and the first lamp attachment structure 56 are symmetrical with respect to the second front end attachment structure 54 and the second lamp attachment structure 58, respectively. In other words, the opposite lateral ends of the vehicle bumper fascia retainer 18 are mirror images of each other.

Figure 13:
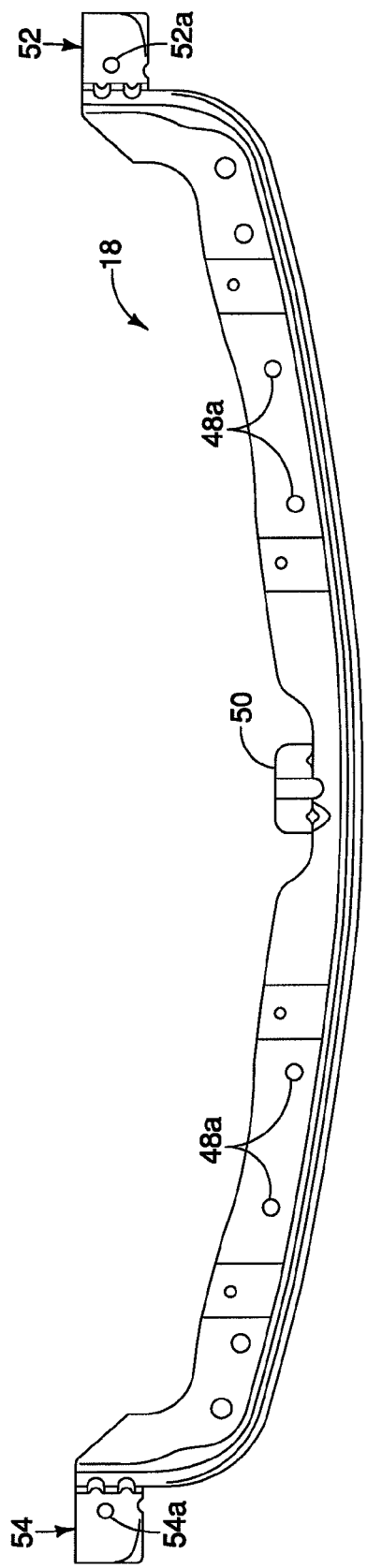
FIG. 13 is a top perspective view of the vehicle bumper fascia retainer of the illustrated embodiment.
Figure 14:
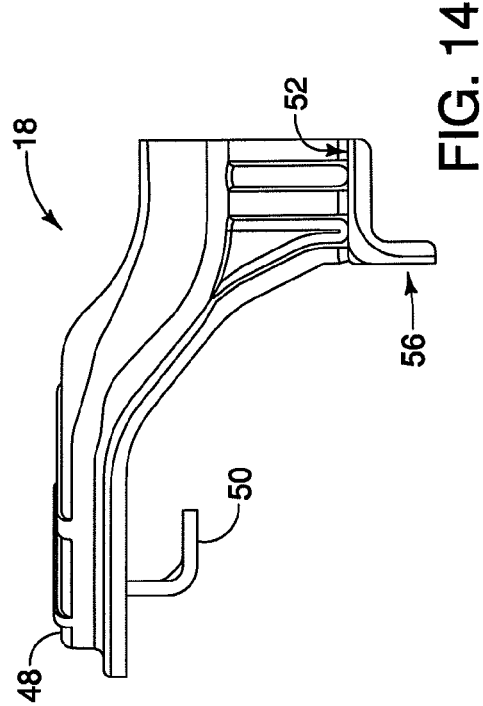
FIG. 14 is a side elevational view of the vehicle bumper fascia retainer of the illustrated embodiment.
Figure 16:
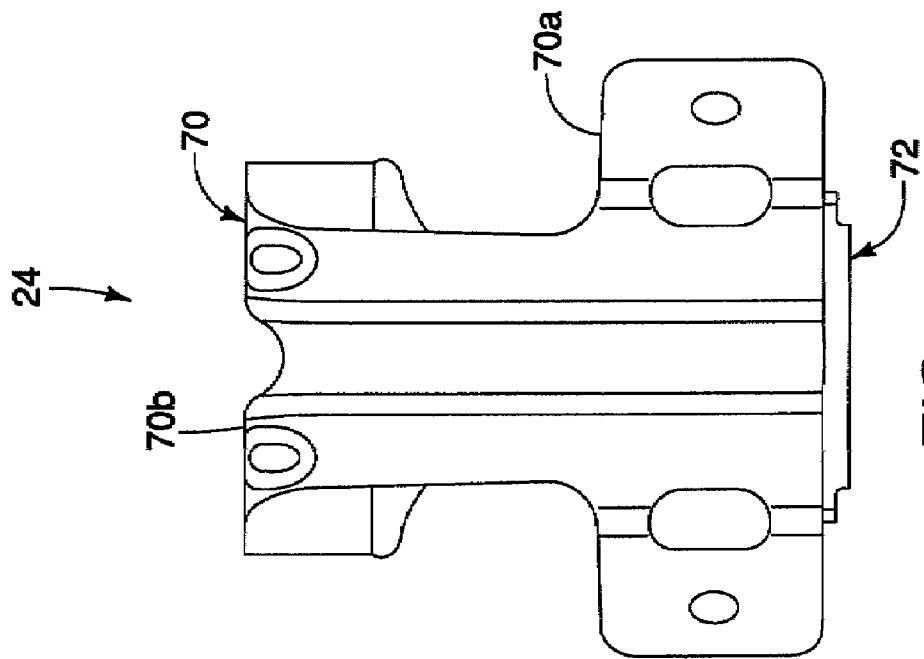
FIG. 16 is a front elevational view of the center front end attachment structure illustrated in FIG. 15.
Figure 15:
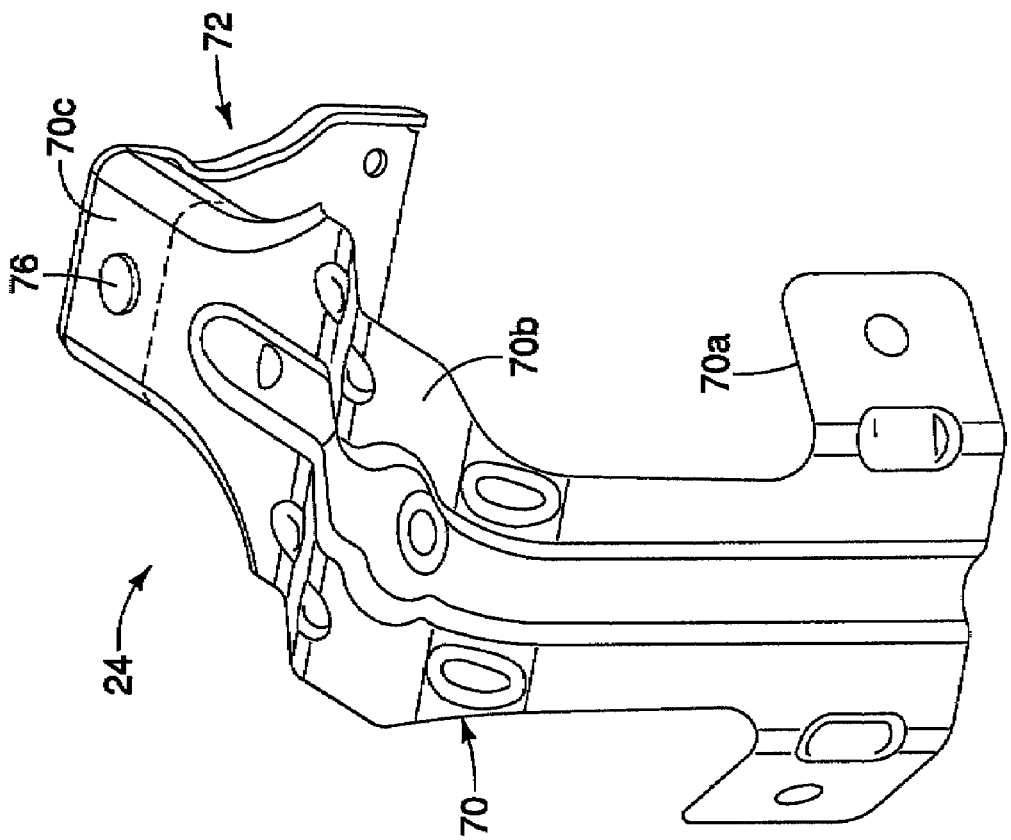
FIG. 15 is a front perspective view of the center front end attachment structure.
Figure 17:
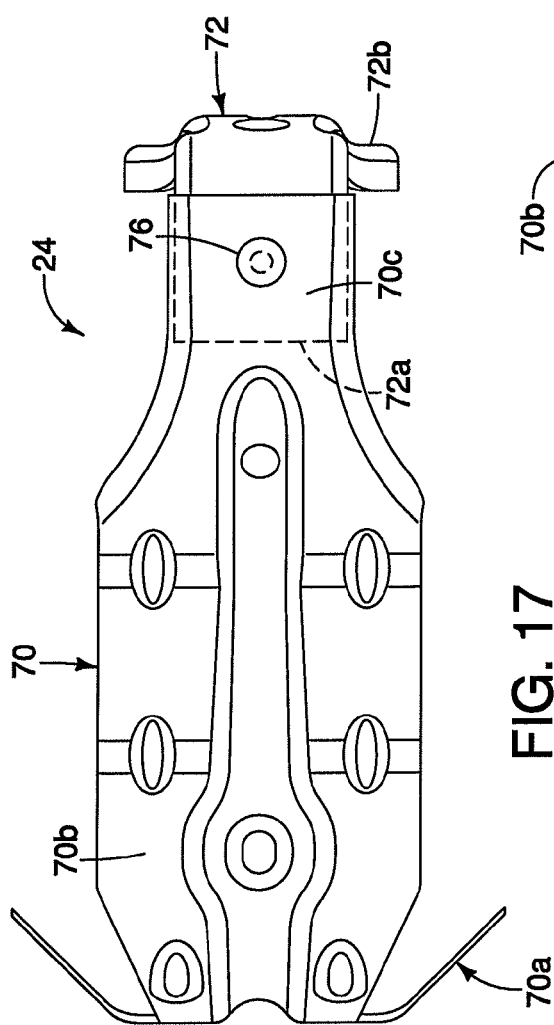
FIG. 17 is a top plan view of the center front end attachment structure illustrated in FIGS. 15 and 16.
Figure 18:
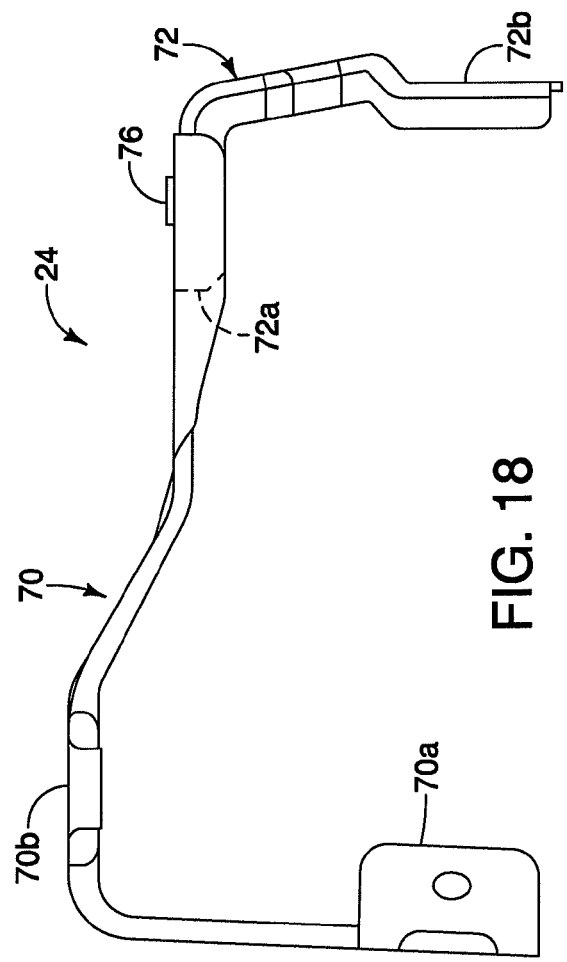
FIG. 18 is a side elevational view of the center front end attachment structure illustrated in FIGS. 15 to 17.

In the illustrated embodiment, as seen in FIGS. 11 and 13, the first front end attachment structure 52 includes a first horizontally oriented mounting flange with a mounting aperture 52*a* and a vertically extending member 52*b*. The vertically extending member 52*b* is disposed between the first horizontally oriented mounting flange and the fascia support portion 48 such that the first horizontally oriented mounting flange and the fascia support portion 48 are spaced apart vertically by an amount equal to a vertical length of the vertically extending member 52*b* when the vehicle bumper fascia retainer 18 is in an installed position. The first lamp attachment structure 56 includes a first vertically oriented mounting flange with a mounting aperture 56*a*. The first vertically oriented mounting flange that forms the first lamp attachment structure 56 extends downwardly from the first horizontally oriented mounting flange that forms the first front end attachment structure 52 such that the flanges form a generally inverted L-shape member.

Similarly, in the illustrated embodiment, as seen in FIGS. 12 and 13, the second front end attachment structure 54 includes a second horizontally oriented mounting flange with a mounting aperture 54*a*. The second lamp attachment structure 58 includes a second vertically oriented mounting flange with a mounting aperture 58*a*. The second vertically oriented mounting flange that forms second lamp attachment structure 58 extends downwardly from the second horizontally oriented mounting flange that forms second front end attachment structure 54 to form a generally inverted L-shape member.

As seen in FIGS. 3 and 4, the first and second head lamp housings 20 and 22 are preferably identical to each other, except that they are mirror images of each other. The first and second head lamp housings 20 and 22 are typically constructed of a hard rigid plastic material with a reflective surface on the forward facing side. The particular shape and construction of the first and second head lamp housings 20 and 22 will depend on the vehicle. Thus, the particular shape and construction of the first and second head lamp housings 20 and 22 will not be described and/or illustrated in detail herein. The first head lamp housing 20 is disposed on the first lateral end of the radiator core support 16 (e.g., a vehicle front end module), while the second head lamp housing 22 is disposed on the second lateral end of the radiator core support 16 (e.g., a vehicle front end module). In particular, the first head lamp housing 20 has a mounting member 20*a* that is secured by a fastener 64 (e.g., a nut and bolt arrangement) to the first vertically oriented mounting flange that forms the first lamp attachment structure 56. Similarly, the second head lamp housing 22 has a mounting member 22*a* that is secured by a fastener 66 (e.g., a nut and bolt arrangement) to the first vertically oriented mounting flange that forms the second lamp attachment structure 58. Thus, first and second head lamp housings 20 and 22 are not directly coupled to the radiator core support 16 (e.g., a vehicle front end module), but rather supported on the vehicle bumper fascia retainer 18, which in turn is directly coupled to the radiator core support 16 (e.g., a vehicle front end module).

In the illustrated embodiment, as seen in FIGS. 15 to 18, the center attachment structure 24 supports an intermediate portion of the vehicle bumper fascia retainer 18 to the radiator core support 16 (e.g., a vehicle front end module). Thus, the center attachment structure 24 constitutes a third front end attachment structure that is disposed between the first and second lateral ends of the fascia support portion 48 for attaching the radiator core support 16 (e.g., a vehicle front end module) and the fascia support portion 48. In the illustrated embodiment, the center attachment structure 24 includes a first mounting bracket 70 and a second mounting bracket 72. The first mounting bracket 70 has an accessory mounting portion 70*a*, a fascia retainer mounting portion 70*b* and a second bracket mounting portion 70*c*. The fascia retainer mounting portion 70*b* of the first mounting bracket 70 is welded the center mounting flange 50 of the vehicle bumper fascia retainer 18. The second mounting bracket 72 is an L-shaped member with a horizontal attachment portion 72*a* and a vertically attachment portion 72*a*. The horizontal attachment portion 72*a* is attached to the first mounting bracket 64 by a fastener 76 such as a rivet, while the vertically attachment portion 72*a* is attached to the radiator core support 16 (e.g., a vehicle front end module) by a pair of fasteners 78 such as bolts. Preferably, the first and second mounting brackets 70 and 72 are constructed of a rigid metal material.

In assembly vehicle front end assembly, for example, various cooling related components (e.g., a radiator core, cooling fans, etc.) and other vehicle components (e.g., a condenser, a windshield wiper fluid container, etc) are first attached to the engine cooling support arrangement 46 of the radiator core support 16 as needed and/or desired. Also a rigid bumper core (not shown) is attached to the radiator core support 16. The center attachment structure 24 is welded to the vehicle bumper fascia retainer 18. Then, the vehicle bumper fascia retainer 18 is directly coupled to the radiator core support 16 (e.g., a vehicle front end module) at three points by the fasteners 60, 62 and 78. Now, the first and second head lamp housings 20 and 22 are directly attached to the vehicle bumper fascia retainer 18 by the fasteners 64 and 66. The bumper fascia panel 14 is then secured to the vehicle bumper fascia retainer 18 by the fasteners 36 so as to overlie the rigid bumper core (not shown). Finally, the first and second bent end portions 32 and 34 of the bumper fascia panel 14 are mounted to the fenders 38 via fasteners (not shown).

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention. The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A vehicle bumper fascia retainer comprising:
   a laterally extending fascia support portion;
   a first front end attachment structure disposed on a first lateral end of the fascia support portion, with the first front end attachment structure being configured to be attached to a vehicle front end at a first point, the first front end attachment structure including a first horizontally oriented mounting flange with a first mounting aperture formed in the first horizontally oriented mounting flange for receiving a fastener to attach the first front end attachment structure to a radiator core support;
   a second front end attachment structure disposed on a second lateral end of the fascia support portion, with the second front end attachment structure being configured to be attached to the vehicle front end at a second point;
   a first lamp attachment structure disposed on the first lateral end of the fascia support portion, with the first lamp attachment structure being configured to support a first head lamp housing; and
   a second lamp attachment structure disposed on the second lateral end of the fascia support portion, with the second lamp attachment structure being configured to support a second head lamp housing.

2. The vehicle bumper fascia retainer according to claim 1, further comprising
   a third front end attachment structure disposed between the first and second lateral ends of the fascia support portion, with the third front end attachment structure being configured to be attached to the vehicle front end at a third point.

3. The vehicle bumper fascia retainer according to claim 1, wherein
   the first lamp attachment structure includes a first vertically oriented mounting flange.

4. The vehicle bumper fascia retainer according to claim 3, wherein
   the first front end attachment structure includes a first horizontally oriented mounting flange.

5. The vehicle bumper fascia retainer according to claim 4, wherein
   the first vertically oriented mounting flange extends downwardly from the first horizontally oriented mounting flange to form a generally inverted L-shape member.

6. The vehicle bumper fascia retainer according to claim 4, wherein
   the second front end attachment structure includes a second horizontally oriented mounting flange and the second lamp attachment structure includes a second vertically oriented mounting flange.

7. The vehicle bumper fascia retainer according to claim 6, wherein
   the first front end attachment structure and the first lamp attachment structure are symmetrical with respect to the second front end attachment structure and the second lamp attachment structure, respectively.

8. The vehicle bumper fascia retainer according to claim 6, wherein
   the first vertically oriented mounting flange extends downwardly from the first horizontally oriented mounting flange to form a generally inverted L-shape member, and the second vertically oriented mounting flange extends downwardly from the second horizontally oriented mounting flange to form a generally inverted L-shape member.

9. The vehicle bumper fascia retainer according to claim 1, wherein
   the first and second front end attachment structures and the first and second lamp attachment structures are integrally formed as a one-piece, unitary member with the laterally extending fascia support portion.

10. The vehicle bumper fascia retainer according to claim 1, further comprising
    a vertically extending member disposed between the first horizontally oriented mounting flange and the laterally extending fascia support portion such that the first horizontally oriented mounting flange and the laterally extending fascia support portion are spaced apart vertically by an amount equal to a vertical length of the vertically extending member when the vehicle bumper fascia retainer is in an installed position and with respect to an upright position of a vehicle having the vehicle bumper fascia retainer.

11. The vehicle bumper fascia retainer according to claim 10, wherein
    the first horizontally oriented mounting flange extends backward from the first vertically oriented mounting flange in a direction toward a back end of the vehicle.

12. The vehicle bumper fascia retainer according to claim 11, wherein
    the first horizontally oriented mounting flange has a first mounting aperture for receiving a fastener to attach the first front end attachment structure to a radiator core support.

13. A vehicle bumper fascia retainer comprising:
    a laterally extending fascia support portion;
    a first front end attachment structure disposed on a first lateral end of the fascia support portion, with the first front end attachment structure being configured to be attached to a vehicle front end at a first point;

a second front end attachment structure disposed on a second lateral end of the fascia support portion, with the second front end attachment structure being configured to be attached to the vehicle front end at a second point;

a first lamp attachment structure disposed on the first lateral end of the fascia support portion, with the first lamp attachment structure being configured to support a first head lamp housing, the first lamp attachment structure having a first vertically oriented mounting flange and the first front end attachment structure having a first horizontally oriented mounting flange such that the first vertically oriented mounting flange extends downward from the first horizontally oriented mounting flange to form a generally inverted L-shape member which is located completely below a lowest vertical point of the laterally extending fascia support portion when the vehicle bumper fascia retainer is in an installed position on a vehicle; and a second lamp attachment structure disposed on the second lateral end of the fascia support portion, with the second lamp attachment structure being configured to support a second head lamp housing.

14. The vehicle bumper fascia retainer according to claim 13, wherein the second lamp attachment structure has a second vertically oriented mounting flange and the second front end attachment structure has a second horizontally oriented mounting flange such that the second vertically oriented mounting flange extends downwardly from the second horizontally oriented mounting flange to form a generally inverted L-shape member which is located completely below the lowest vertical point of the laterally extending fascia support portion when the vehicle bumper fascia retainer is in the installed position.

15. The vehicle bumper fascia retainer according to claim 13, wherein the first horizontally oriented mounting flange extends backward from the first vertically oriented mounting flange in a direction toward a back end of the vehicle.

16. The vehicle bumper fascia retainer according to claim 14, wherein the first and second horizontally oriented mounting flanges extend backward from the first and second vertically oriented mounting flanges, respectively, in a direction toward a back end of the vehicle.

17. A vehicle bumper fascia retainer comprising:

a laterally extending fascia support portion;

a first front end attachment structure disposed on a first lateral end of the fascia support portion, with the first front end attachment structure being configured to be attached to a vehicle front end at a first point;

a second front end attachment structure disposed on a second lateral end of the fascia support portion, with the second front end attachment structure being configured to be attached to the vehicle front end at a second point;

a third front end attachment structure disposed between the first and second lateral ends of the fascia support portion, with the third front end attachment structure being configured to be attached to the vehicle front end at a third point, the third front end attachment structure including a first mounting bracket which extends downward when the vehicle bumper fascia retainer is in an installed position on a vehicle and a second mounting bracket which extends entirely backward from the laterally extending fascia support portion in a direction toward a back end of the vehicle;

a first lamp attachment structure disposed on the first lateral end of the fascia support portion, with the first lamp attachment structure being configured to support a first head lamp housing; and a second lamp attachment structure disposed on the second lateral end of the fascia support portion, with the second lamp attachment structure being configured to support a second head lamp housing.

18. The vehicle bumper fascia retainer according to claim 17, wherein the first mounting bracket includes an accessory mounting portion for mounting an accessory thereto, and the second mounting bracket is an L-shaped member with a vertical attachment portion for attaching to a radiator core support.

\* \* \* \* \*